United States Patent [19]

Ishida et al.

[11] Patent Number: 4,510,668
[45] Date of Patent: Apr. 16, 1985

[54] MACHINING CENTER

[75] Inventors: Kenichi Ishida, Nagaoka; Tetsuro Takahashi, Ojiya, both of Japan

[73] Assignee: Tsugami Corporation, Japan

[21] Appl. No.: 374,510

[22] Filed: May 3, 1982

[30] Foreign Application Priority Data

May 13, 1981 [JP] Japan ................................ 56-70673
Dec. 11, 1981 [JP] Japan ................................ 56-198467

[51] Int. Cl.³ ............................................ B23Q 5/22
[52] U.S. Cl. ...................................... 29/561; 74/826; 409/221; 409/235; 82/2 R
[58] Field of Search ............... 29/561, 563, 568, 27 C, 29/33 P; 409/235, 219, 221, 241; 408/35, 234; 74/826; 82/2 A, 2 R, 27, 28 B, 36 A

[56] References Cited

U.S. PATENT DOCUMENTS

| 3,545,317 | 12/1970 | Shultz et al. | 82/36 A |
| 3,821,844 | 7/1974 | Harmon et al. | 29/568 |
| 3,918,331 | 11/1975 | Svanstrom | 82/2 R |
| 3,943,802 | 3/1976 | Luebkemann et al. | 82/36 A |
| 4,080,853 | 3/1978 | Goto | 408/35 |
| 4,148,235 | 4/1979 | Gerth | 82/27 |
| 4,274,773 | 6/1981 | Burkhardt et al. | 409/221 |
| 4,369,563 | 1/1983 | Williamson | 29/568 |

FOREIGN PATENT DOCUMENTS

| 132888 | 10/1979 | Japan | 82/36 A |
| 137805 | 10/1980 | Japan | 82/36 A |
| 82157 | 7/1981 | Japan | 29/568 |

*Primary Examiner*—Gil Weidenfeld
*Assistant Examiner*—Daniel W. Howell
*Attorney, Agent, or Firm*—Brady, O'Boyle & Gates

[57] ABSTRACT

A machining center of a horizontal type including a vertical base is disclosed. A pallet carrying a workpiece to be machined is mounted on a pallet slide with a pallet surface being vertical so that the pallet is movable along a first horizontal axis and rotatable about this first axis. The pallet slide is mounted on the vertical base so as to be movable vertically along a first vertical surface of this base, this surface being parallel to the first axis. A spindle supporting a tool for machining the workpiece is mounted in a spindle slide so that the spindle is rotatable about a second horizontal axis making a right angle with the first axis. The spindle slide is supported by the vertical base so as to be movable horizontally along a second vertical surface of the base, said second surface making a right angle with the first vertical surface of the base. Accordingly, a wide space is formed below the workpiece and tool supported by the pallet slide and spindle slide respectively.

6 Claims, 6 Drawing Figures

MACHINING CENTER

TECHNICAL FIELD

The present invention relates to a machining center, that is, a numerically controlled universal machine tool, and especially to such a machining center of a horizontal type.

BACKGROUND OF THE INVENTION

The previously known machining center of a horizontal type has a horizontally extending machine bed, on which, on the one hand, at least two movable supporting members are connected one upon the other, and on the other hand, a vertical column is fixed. A workpiece to be machined is attached to a pallet surface of a pallet, and this pallet is removably mounted on the uppermost one of the movable supporting members so that the pallet surface is horizontal. A tool for machining the workpiece is attached to a spindle, and a spindle slide supporting this spindle is mounted on the upper portion of the vertical column.

Such a known machining center has several drawbacks. Firstly, since the workpiece is placed on the horizontal surface of the pallet, chips produced during the machining accumulate on the pallet and occasionally on the workpiece itself. Accordingly, the pallet with the workpiece should be cleaned when it is removed from the uppermost movable member. Secondly, since the workpiece is machined in a position above the machine bed, some chips and cutting oil poured to the machining spot between the workpiece and tool during the machining operation fall onto the machine bed, and therefore the machine bed is deformed through the heat involved in the chips and oil. Moreover, since guideways for guiding said movable supporting members and the like are formed in the upper surface of the machine bed, fallen chips and cutting oil entering into said guideways and the like easily cause malfunctioning of, the machine bed and movable supporting members. Further, because of said guideways formed in the upper surface of the machine bed and driving mechanisms arranged on this surface, it is difficult to arrange means for receiving the chips and cutting oil on the machine bed. Thirdly, the workpiece and tool are connected to each other through a structural span extending in a vertical plane and composed of the pallet supporting the workpiece, the several movable supporting members connected one upon the other and supporting the pallet, the machine bed on which the supporting members are connected, the vertical column standing on the machine bed, the spindle slide mounted on the upper portion of the column, and the spindle supported by the spindle slide and supporting the tool, and this structural span is very long according to the known prior art structure. Accordingly, the stiffness of the machine is low and the thermal displacement and the mechanical displacement based upon the cutting resistance between the workpiece and tool are both large.

SUMMARY OF THE INVENTION

A main object of the invention is to provide a new and useful machining center which eliminates the drawbacks of the previously known machining center.

In order to achieve said object, the invention provides a machining center comprising a pallet slide for supporting a pallet having a vertical pallet surface for carrying a workpiece so that the pallet is movable along a first horizontal axis and rotatable about said first axis for indexing, a spindle slide for supporting a spindle for carrying a tool so that the spindle is rotatable about a second horizontal axis positioned at a right angle with said first axis, and a vertical bed having a first vertical surface being parallel to said first axis and a second vertical surface being parallel to said second axis, said pallet slide being arranged on said first surface so as to be movable vertically along said first surface and said spindle slide being arranged on said second surface so as to be movable horizontally along said second surface in order to form a wide space between the side of the pallet slide on which the pallet is mounted and the side of the spindle slide on which the tool is mounted.

It is preferable that said pallet slide is provided with a supporting shaft that is movable in the direction of the first axis in the pallet slide and with a indexing shaft that is rotatable about the first axis in relation to the supporting shaft, and the pallet is supported by the indexing shaft: and it is more preferable that the indexing shaft is so arranged that it can be shifted in relation to the supporting shaft in the axial direction of the first axis, and between the supporting shaft and indexing shaft there is arranged means for preventing said indexing shaft from rotating if it is shifted in one direction and for causing said indexing shaft to be rotatable if it is shifted in the opposite direction.

According to an embodiment, the first vertical surface is formed with means for guiding the movement of the pallet slide vertically, and the pallet slide is moved by means of a rotatable vertical screw rod engaged with a nut portion fixed to the pallet slide. Means for moving the spindle slide may be constructed in the same way.

BRIEF DESCRIPTION OF THE DRAWINGS

The preferred embodiment of the invention will now be described in great detail with reference to the accompanying drawings wherein.

DETAILED DESCRIPTION OF THE PREFERRED EMBODIMENT

Figure 1:
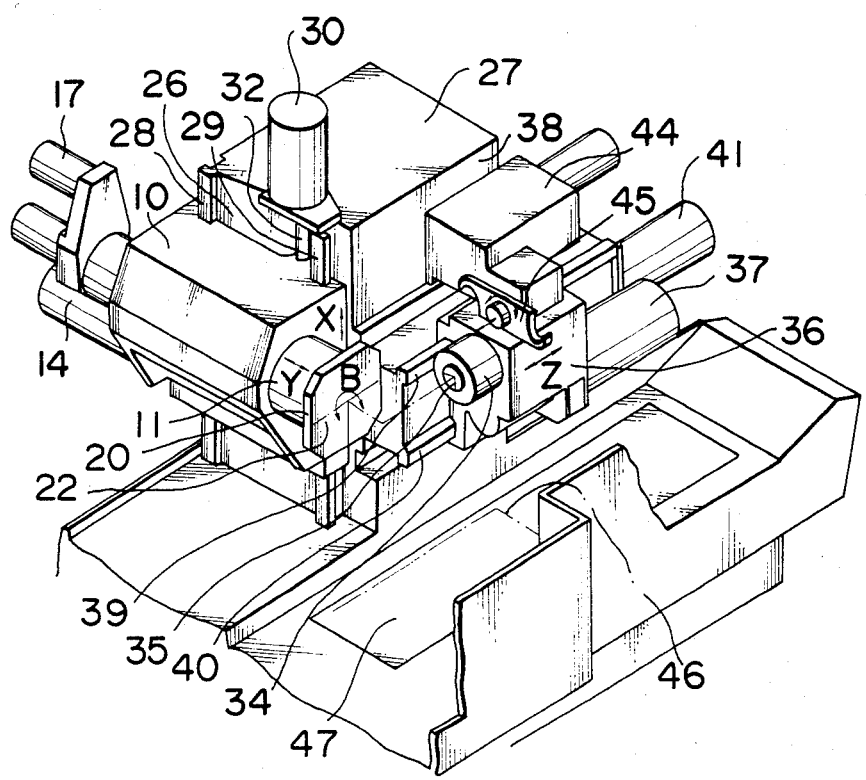
FIG. 1 is a simplified perspective view showing an embodiment of the machining center according to the invention.
Figure 2:
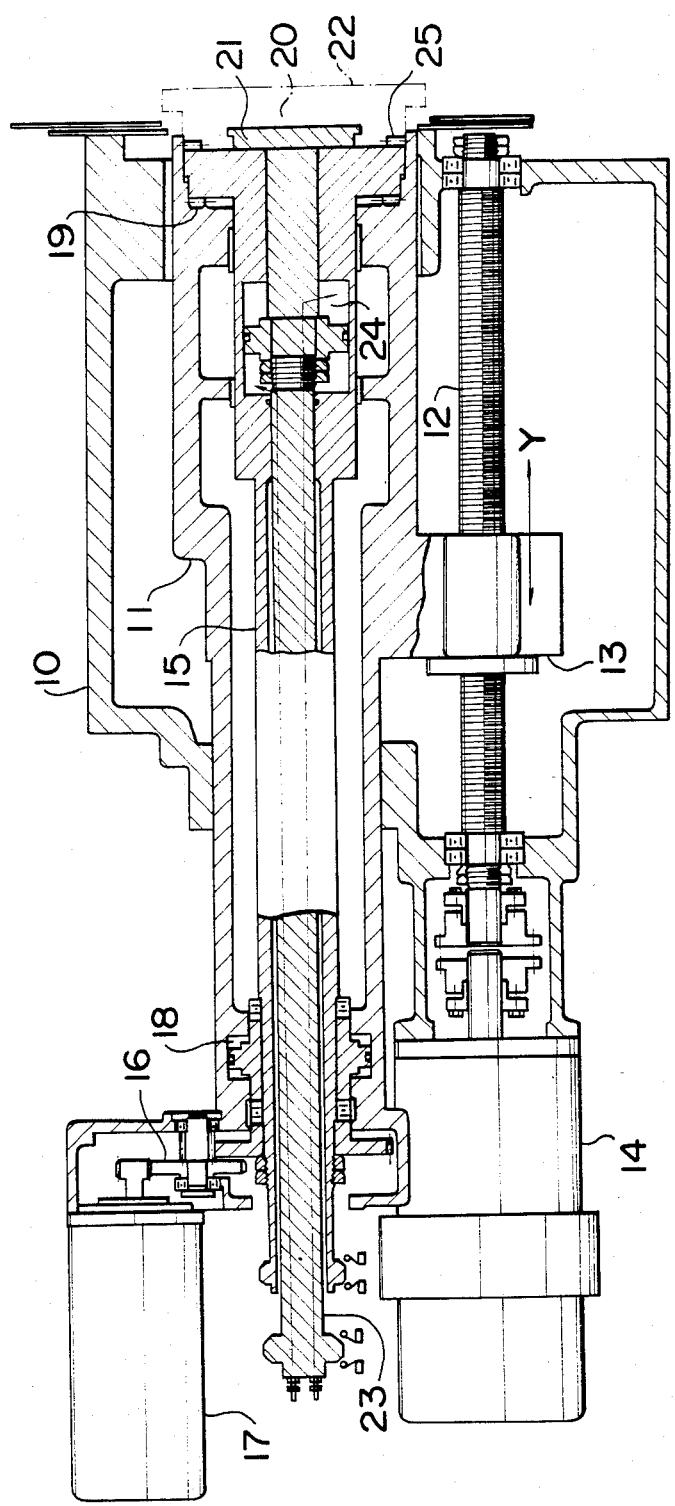
FIG. 2 is a vertical sectional view showing the inner construction of the pallet slide in the machining center.

FIG. 1 shows the main components of an embodiment of the machining center according to the invention, wherein a pallet slide 10 is provided with a pallet supporting shaft 11 having an axis called a Y-axis which extends in a first horinontal direction, that is, Y-direction. As shown in FIG. 2, the pallet supporting shaft 11 can be moved or shifted in the Y-direction through a transmission mechanism (such as a screw rod 12 engaged with a nut portion 13 fixed to the pallet slide 10) by means of a Y-axis servo-motor 14 arranged behind the pallet slide 10. The supporting shaft 11 includes an indexing shaft 15 which is rotatable about the Y-axis (as indicated by an arrow B in FIG. 1) in relation to the supporting shaft 11 for indexing. The indexing shaft 15 is rotated through a transmission mechanism such as a gear assembly 16 by means of an indexing servo-motor 17 arranged behind the pallet slide 10. In order to rotate the indexing shaft 15, it is necessary to shift forward (to the right in FIG. 2) this indexing shaft by means of a piston-cylinder mechanism 18 so as to release a coupling 19 between the coaxially connected indexing shaft 15 and supporting shaft 11. This coupling 19 is, for example, composed of a forwardly facing toothed face on the supporting shaft 11 and another rearwardly facing toothed face on the indexing shaft 15. These toothed faces are fixedly engaged with each other if the indexing shaft 15 is shifted rearward, and are disengaged from each other if the shaft 15 is shifted forward.

Figure 5:
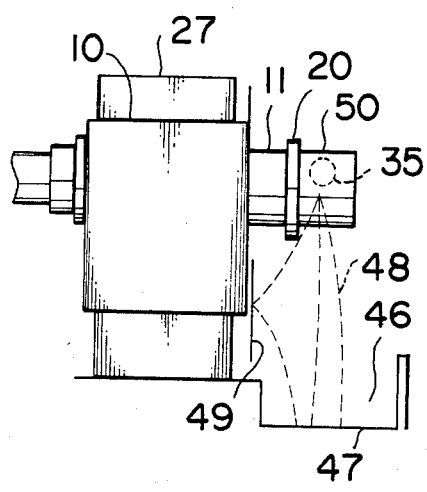
FIGS. 5 and 6 are diagramatic end and top views respectively, illustrating features of the machining center according to the invention.
Figure 6:
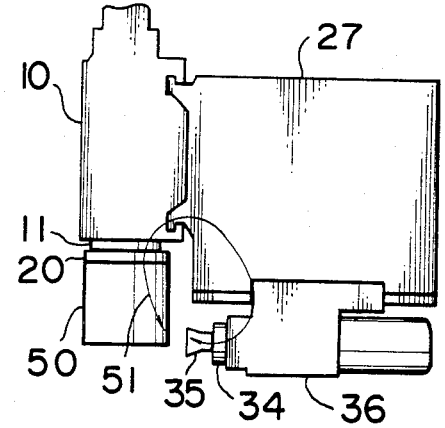

A pallet 20 for carrying or supporting a workpiece (not shown here, but shown and indicated by a reference numeral 50 in FIGS. 5 and 6) is able to be mounted on a clamping plate 21 connected at the front end of the indexing shaft 15. When mounted, the pallet 20 is so positioned that the pallet surface 22 on which the workpiece is supported is vertical. When mounting the pallet 20, after it is connected to clamping plate 12 the clamping plate 21 and a clamping shaft 23 fixed to this plate 21 are withdrawn (moved to the left to the position shown in FIG. 2) in the indexing shaft 15 by means of a piston-cylinder mechanism 24 arranged in the indexing shaft 15 in order to engage the pallet 20 with the indexing shaft 15 by means of a positioning coupling 25. When dismounting the pallet 20, the plate 21 and shaft 23 are moved to the right from the shown position in order to release the coupling 25.

The pallet slide 10 is so arranged that it is movable in the vertical direction called an X-direction along a first vertical surface 26 of a vertical bed 27, said vertical surface 26 being parallel to the first horizontal axis or Y-axis (FIG. 1). The vertical surface 26 is formed with two vertically extending X-guides 28 and 29 for guiding the pallet slide 10 in the vertical direction or X-direction.

Figure 3:
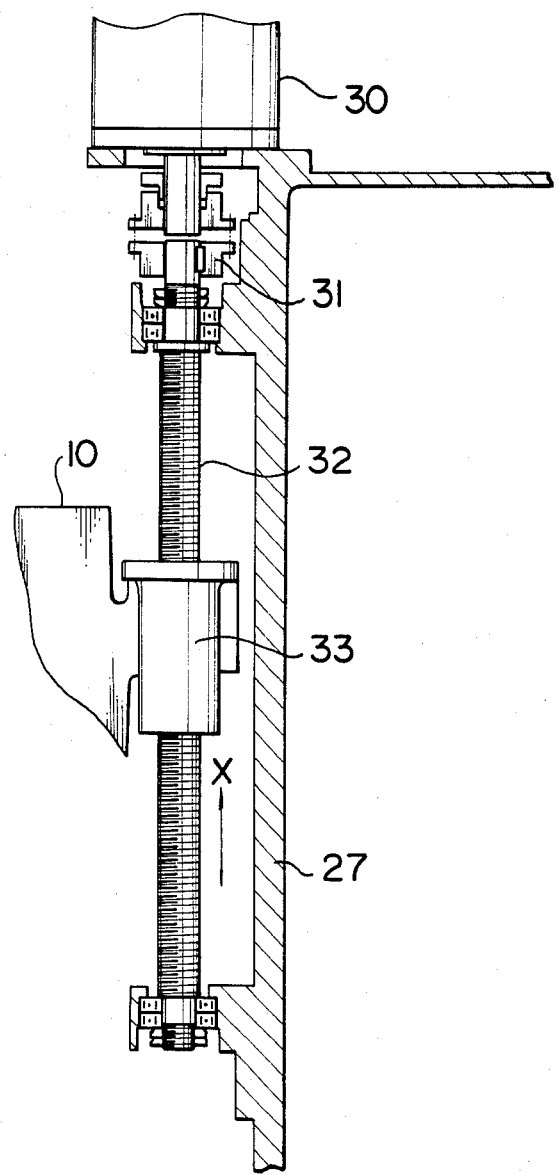
FIG. 3 is a vertical sectional view showing a mechanism for moving the pallet slide vertically.

In order to move the pallet slide 10 vertically, an X-axis servo-motor 30 fixed to the upper portion of the vertical bed 27 has, as shown in FIG. 3, an output axis connected drivingly through a coupling 31 to a vertically (that is, in the X-direction) extending screw rod 32, which is mounted on the vertical bed 27 so that this rod can be rotated but cannot be moved axially. A nut portion 33 fixed to the pallet slide 10 is engaged with the screw rod 32. Accordingly, if the screw rod 32 is rotated by means of the X-axis servo-motor 30, the pallet slide 10 is moved in the X-direction.

Figure 4:
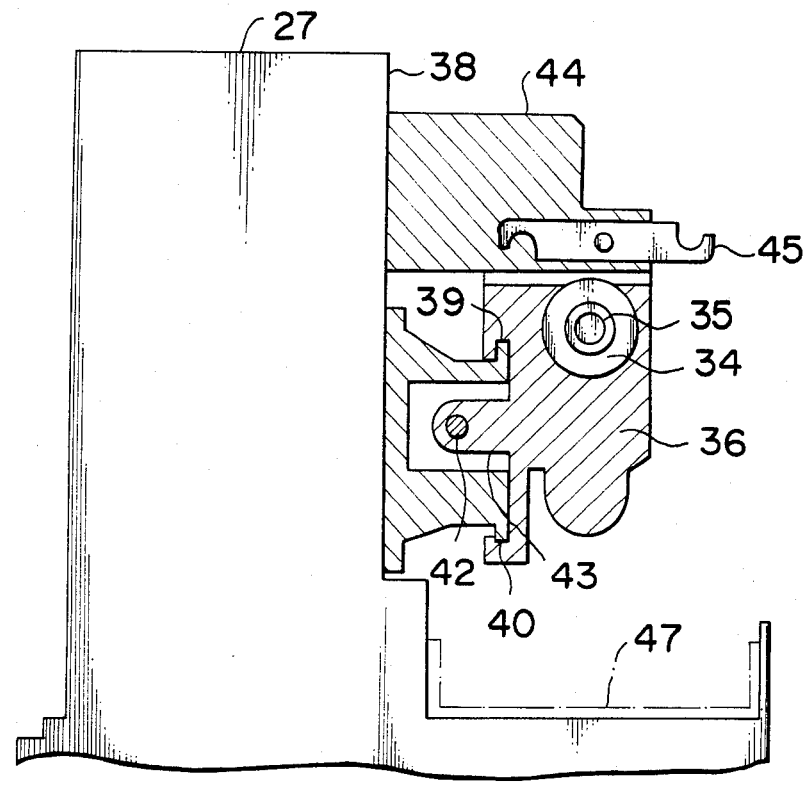
FIG. 4 is a vertical sectional view showing mainly a mechanism for moving the spindle slide in the machining center.

A spindle 34 for supporting a tool 35 at the front end (that is, the left end in FIG. 1) of this spindle as shown in FIGS. 1 and 4 is supported in a spindle slide 36 and extends in a second horizontal direction (Z-direction) making a right angle with the first horizontal direction or Y-direction. The spindle 34 is rotatable about a Z-axis (i.e. an axis extending in the Z-direction) through an appropriate transmission mechanism (not shown) by means of a spindle motor 37.

The vertical bed 27 has a second vertical surface 38 which is parallel to the second horizontal axis or Z-axis and therefore makes a right angle with the first vertical surface 26. The second vertical surface 38 is formed with two Z-guides 39 and 40 extending in the Z-direction. The spindle slide 36 is supported and guided by these Z-guides 39 and 40 so as to be movable in the second horizontal direction on Z-direction along the second vertical surface 38.

The spindle slide 36 is moved in the second horizontal direction (Z-direction) by means of a Z-axis servo-motor 41 for driving a screw rod 42 which extends in the Z-direction and is engaged with a nut portion 43 fixed to the spindle slide 36 (FIG. 4). The servo-motor 41, screw rod 42 and nut portion 43 correspond to the servo-motors 14 and 30, screw rods 12 and 32 and nut portions 13 and 33 shown in FIGS. 2 and 3 respectively.

In FIGS. 1 and 4, there is shown a tool exchange device 44 for exchanging the tool 35 mounted on the spindle 34 for one of tools accommodated in a tool magazine (not shown), and this device 44 includes a tool exchanging arm 45 used for changing positions of the tools.

In general, the machining center has has a pallet exchange device (not shown) for exchanging the pallet 20 supported by the pallet supporting shaft 11 for another not supported by the shaft 11. Moreover, an operating board and a NC device are included in the machining center in order to operate and control numerically the whole of the machining center respectively.

According to the construction and arrangement as above-explained, it is clear that a wide space 46 is formed below the pallet 20 supported by the pallet slide 10 and the tool 35 supported by the spindle slide 36 (FIGS. 1 and 4). In or below this space 46, a chip pan 47 is positioned for receiving chips cut from the workpiece as well as cutting oil applied to the workpiece and tool during the machining.

In the operation of the machining center according to the invention, the pallet 20 carrying the workpiece is so positioned that the pallet surface 22 is vertical, and then mounted on the pallet supporting shaft 11 (especially, the indexing shaft 15). Thereafter, the pallet supporting shaft 11 is shifted in the first horizontal direction or Y-direction, the indexing shaft 15 is rotated for indexing and the pallet slide 10 is shifted in the vertical direction or X-direction under control of the numerical control device according to the machining condition in order to move the workpiece to a desired machining position. Thereafter, therebefore or simultaneously, the spindle slide 36 is moved in the second horizontal direction or Z-direction under control of the numerical control device in order to move the tool 35 to the desired machining position. Then the workpiece is machined by means of the tool 35, while the pallet supporting shaft 11 is moved in the Y-direction and in the X-direction and the tool 35 is rotated about the Z-axis and moved in the Z-direction under control by the numerical control device according to the desired machining pattern.

Since it is clear that the machining position is situated on the side of the pallet (20) mounted on the pallet slide 10 and on the side of the tool (35) toward the spindle slide 36 and the chip pan 47 is arranged below the machining position, the chips cut from the workpiece and cutting oil applied to the machining position (these are indicated by a reference numeral 48) fall directly onto the chip pan 47 as shown schematically in FIG. 5, in which a reference numeral 49 indicates a chip cover arranged optionally and the workpiece is denoted by a reference numeral 50.

The machining center according to the invention has many advantages because of the constitution of it as abovedescribed. Firstly, since the wide space 46 is formed below the machining position, the chips and cutting oil 48 falling from the machining position can be received by the chip pan 47 or the like arranged in or below the wide space 46. Accordingly, the second drawback of the previously known machining center (thermal deformation, contamination with chips and cutting oil, and difficulty in arranging the chip pan or the like) can be eliminated completely. Secondly, since the pallet 20 is mounted on the pallet supporting shaft 11 (the indexing shaft 15) in the position where the pallet surface 22 is positioned vertically, no chip accumulates on the workpiece itself.

As another advantage of the machining center of the invention, the workpiece 50 and tool 35 are connected to each other through a horizontal structural span 51 composed of the pallet 20, the supporting shaft 11, the pallet slide 10, the vertical bed 27, the spindle slide 36 and the spindle 34. This horizontal span 51 is shorter than the vertical structural span in the previously known machining center. Accordingly, the stiffness or rigidity of the machine is relatively high, and the thermal displacement and mechanical displacement based upon the cutting resistance are small in the machining center according to the invention.

We claim:

1. A machining center comprising a vertical bed (27) having a first vertical surface (26) and a second vertical surface (38) at right angles to said first vertical surface (26), a pallet slide (10), first means (28, 29, 30, 32, 33) connecting said pallet slide (10) for vertical movement on said first vertical surface (26), a spindle slide (36), second means (30, 40, 41, 42, 43) connecting said spindle slide (36) for horizontal movement on said second vertical surface (38), a supporting shaft (11) having a first horizontal axis (Y) parallel to said first vertical surface (26) connected to said pallet slide (10) for axial movement along said first horizontal axis (Y), means (12, 13, 14) to axially move said supporting shaft (11) along said first horizontal axis (Y), an indexing shaft (15) connected coaxially in said supporting shaft (11) and for shifting movement in the direction of said first horizontal axis (Y), means (18) to shift said indexing shaft (15) in the direction of said first horizontal axis (Y), coupling means (19) between said supporting shaft (11) and indexing shaft (15) engaged to connect said shafts when the indexing shaft (15) is shifted in one direction and disengaged to release said shafts from each other when the indexing shaft (15) is shifted in the other direction, transmission means (16) connected to rotate said indexing shaft (15) relative to said supporting shaft (11) when said indexing shaft (15) is shifted in said other direction, a clamping shaft (23) included in and axially shiftable in the direction of said first horizontal axis (Y) in said indexing shaft (15) between two positions, means (24) to shift said clamping shaft (23) between said two positions, a clamping plate (21) connected on the end of the clamping shaft (23) toward said spindle slide (36), a pallet (20) having a vertical pallet surface (22) for carrying a workpiece removably engageable with said clamping plate (21), a positioning coupling (25) engaged between said pallet (20) and indexing shaft (15) in one of said two positions of said clamping shaft (23) and released in the other of said two positions of said clamping shaft (23) for removal of said pallet (20) from said clamping plate (21), a spindle (34) for carrying a tool connected in said spindle slide (36) for rotation about a second horizontal axis (Z) disposed at right angles with said first horizontal axis (Y), said second horizontal axis (Z) positioned parallel with said second vertical surface (38), whereby said pallet is axially movable along said first horizontal axis (Y) by said means (12, 13, 14) to axially move said supporting shaft (11), by said means (18) to shift said indexing shaft (15) and by said means (24) to shift said clamping shaft (23), and is rotatable about said first horizontal axis by said transmission means (16) for indexing, said first horizontal axis is movable in a vertical plane, said spindle is rotatable about and axially shiftable along said second horizontal axis (Z), and a wide space is formed beneath the machining position for a workpiece.

2. A machining center according to claim 1, wherein said first means for vertically moving the pallet slide includes a rotatable vertical screw rod engaged with a nut portion fixed to the pallet slide.

3. A machining center according to claim 1 or 2 wherein said second means for horizontally moving the spindle slide includes a rotatable horizontal screw rod engaged with a nut portion fixed to the spindle slide.

4. A machining center as set forth in claim 1, including a chip receiving means (47) positioned in the wide free space (46) beneath the machining position between the forward surfaces of said pallet slide (10) and spindle slide (36) which are at right angles to each other.

5. A machining center as set forth in claim 1, in which said coupling means (19) comprises a forwardly facing tooth face on the forward end of said supporting shaft (11), and a mating rearwardly facing tooth face on an end portion of said indexing shaft (15).

6. A machining center as set forth in claim 5, in which said positioning coupling (25) comprises a forwardly facing tooth face on the end of said indexing shaft, and a mating rearwardly facing toothed face on the rearwardly facing surface of said pallet (20).

* * * * *